H. M. COLLIER.
Car Brake.
No. 20,769. Patented June 29, 1858.
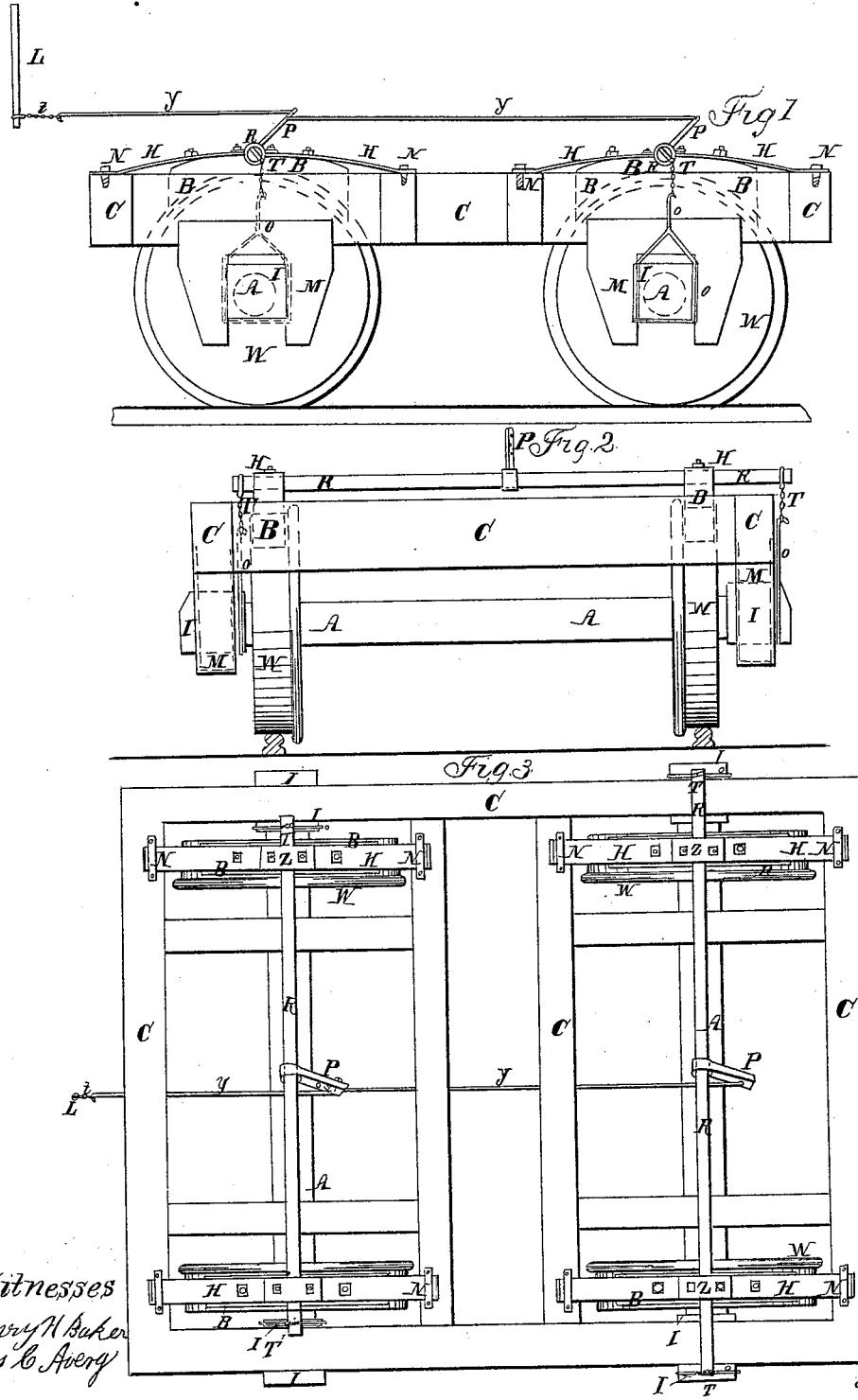

UNITED STATES PATENT OFFICE.

HENRY M. COLLIER, OF BINGHAMTON, NEW YORK.

RAILROAD-CAR BRAKE.

Specification of Letters Patent No. 20,769, dated June 29, 1858.

*To all whom it may concern:*

Be it known that I, HENRY M. COLLIER, of Binghamton, in the county of Broome and State of New York, have invented a new and useful Improvement in Railroad-Car Brakes; and I do hereby declare that the following is a full, clear, and exact description of the same.

The nature of my invention consists in attaching the brake-block or rubber to an adjustable rock-shaft, which has a movement toward and from the wheel simultaneous with said rubber, and which has a connection with the car-axle or axle-box (or some like point which retains its relative distance from the periphery of the car-wheel) by means of a chain and rod, or strap, or some analogous device, so that when the rock-shaft is rotated and winds-up or shortens said connection, or is otherwise depressed, the brake-rubber has a corresponding movement toward and against the periphery of the wheel with a certain, uniform, and rigid application of the retarding force; and in the use of a spring or spring-bar likewise attached near its center to said rubber, and resting at each end upon the truck-frame and thereto fastened which relieves and carries said rubber-block clear of the wheel when not in operation, and performs the further duty of controlling the longitudinal and lateral movement of said rubber when in operation.

I do hereby declare the following to be a clear and accurate description of my invention reference being had to the accompanying drawings in which the several letters in the different figures refer to corresponding portion or parts.

Figure 1 is a side plan, Fig. 2 an end plan and Fig. 3 a top plan of an ordinary railroad truck with my brake attached.

C, C, C, represents an ordinary truck-frame constructed of wood; W, W, the wheels; A, A, the axles; I, I, the axle-boxes; M, M, the pedestal-jaws, or cast iron frames which hold and in which slide the boxes I, I. (The above portions, constituting an ordinary truck, are represented with black lines, the parts constituting my brake arrangement being represented with red lines.)

B, B, represent brake-rubbers or blocks of wood or iron, or partly of wood and partly of iron, the under surfaces of which are about 3 inches in width and from 18 to 24 inches in length, and of a shape to fit snugly to the periphery of the wheel. These brake-blocks or rubbers are secured by means of bolts or otherwise to a leaf of spring steel, or iron, H, H, about 2 or 3 inches in width and ¼ in thickness and of sufficient length to reach to the cross beams of the truck-frame. The ends of these springs are slotted to receive the bolts N, N, which are screwed into the truck frame, and which forms an attachment of the springs (H, H,) to the truck-frame, while it allows sufficient longitudinal movement of the springs to prevent buckling and secure a tensile or pulling strain upon said springs. (The same object can be accomplished by turning a lip upon the ends of the springs, and staples, or straps, over the springs, and driven into, or fastened to, the truck-frame, to confine them in the manner represented in Fig. 3, at N, N.) These springs are of sufficient strength to control the longitudinal and lateral movement of the rubber upon the wheel and elasticity to release the rubbers from the wheels, and carry them and their attachments easy and at all times clear of the wheels when not in operation. To the center of these springs and rubber-blocks is attached the rock-shaft R, R, which I construct of a round bar of iron, 1½ inches in diameter and of sufficient length to reach across the truck frame from outside to outside of wheels. At, or near, the extreme ends of these shafts are attached, by means of eye-bolts passing through said rock-shafts, short chains T, T, made of ⅜ or ½ inch iron, the links (3 or 4 in number) of such size as will wind readily around the rock shaft. From these chains extend downward hooked bolts O, O, attached to the axle-boxes, or underneath the springs, or such other points as have a corresponding motion with said axle boxes, and have and retain a uniform position in relation to the periphery of the wheel, and thus forms a rigid and unvarying hold for said chains (T, T,). I give the springs H, H, a set of 1½ or 2 inches, or an amount equal to the entire range of the truck springs, which will thus compensate for all the movement of the truck-frame upon its springs, and still keep the brake-blocks or rubbers clear of the wheel when not in operation. When I complete the connection of the rock-shafts and rubbers with the chains T, T, and the straps or bolts O, O, I draw these connections snug so as to bring the rubbers within ⅛ of an inch of the wheel. By this construction of springs and the attachments above described I accomplish the very desirable objects of a very slight clearance of the rubber from the wheel (reducing the lost motion) and yet by the set of the springs above mentioned I insure that clearance at all times (when brake should be inoperative) unaffected by the vertical movement of the truck-frame upon the truck-springs. Furthermore by this construction the whole apparatus is kept snug and tight, preventing a loose and shackling wear of the several parts and I secure by the above arrangement of rock-shaft, chains, rods, &c., a powerful leverage and a quick and rigid application of the rubbers to the wheels. At some convenient point upon said rock-shaft (R, R,) between said wheels, are firmly attached levers P, P, about 10 or 12 inches in length. To these levers are attached connecting rods Y, Y, of ½ inch or ⅝ round iron, extending from said rock-shafts to the chain $t$, which connects the whole apparatus to the shaft L, of the hand-wheel or brake-stand on platform of car. Similar rods Y, Y, also connect the rock-shaft (R, R,) with one another.

By winding up the chain ($t$,) around the brake-stand (L,) the rods (Y, Y,) are drawn forward and the levers (P, P,), which rotate the rock-shafts (R, R). Rotating the rock-shafts winds up the chains T, T, and they, being connected firmly with the axle-boxes or their equivalents, draw down the brake-blocks or rubbers (B, B,) upon the periphery of the car wheels with a uniform pressure equal to the power excited by means of the combined levers and shafts, thus forming a perfectly rigid and uniform pressure and consequent friction upon the wheels, and affording a most efficient retarding power to the motion of the car-wheels.

This constitutes a simple and economical mode of applying my invention.

I do not claim broadly the application of brake blocks or rubbers to the top or upper portion of the wheel. Nor do I claim broadly the method of operating a railroad car-brake by obtaining the leverage from the axles and boxes by means of the bridges, keys and clutches or their equivalents as set forth in the specification of Gideon Hotchkiss's patent. Nor do I claim broadly a spring to disengage the rubbers from the wheels, nor a rock-shaft to operate said brakes.

I claim—

The arrangement and combination of the rockshaft R, with the spring H, and the axle-boxes I, I, substantially as herein shown and described.

March 28", 1857.

H. M. COLLIER.

Witnesses:
E. C. SHEPARD,
A. B. GRANT.